(12) United States Patent
Kirchner

(10) Patent No.: US 9,657,842 B2
(45) Date of Patent: May 23, 2017

(54) SHAFT SEAL ARRANGEMENT

(71) Applicant: SIEMENS AKTIENGESELLSCHAFT, München (DE)

(72) Inventor: Christian Kirchner, Moers (DE)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/419,263

(22) PCT Filed: Jul. 25, 2013

(86) PCT No.: PCT/EP2013/065735
§ 371 (c)(1),
(2) Date: Feb. 3, 2015

(87) PCT Pub. No.: WO2014/023581
PCT Pub. Date: Feb. 13, 2014

(65) Prior Publication Data
US 2015/0226336 A1    Aug. 13, 2015

(30) Foreign Application Priority Data
Aug. 10, 2012  (DE) .................. 10 2012 214 276

(51) Int. Cl.
*F16J 15/34* (2006.01)
*F16J 15/44* (2006.01)
(Continued)

(52) U.S. Cl.
CPC .............. *F16J 15/44* (2013.01); *F01D 11/02* (2013.01); *F16J 15/164* (2013.01); *F16J 15/3412* (2013.01); *F16J 15/40* (2013.01)

(58) Field of Classification Search
CPC ...... F16J 15/34; F16J 15/3404; F16J 15/3408; F16J 15/3412; F16J 15/3424
See application file for complete search history.

(56) References Cited

U.S. PATENT DOCUMENTS 3,744,805 A * 7/1973 Heinrich ........................ 277/400
3,746,350 A * 7/1973 Mayer et al. .................. 277/399
(Continued)

FOREIGN PATENT DOCUMENTS

| CN | 101016949 A | 8/2007 |
|----|-------------|--------|
| CN | 101749429 A | 6/2010 |

(Continued)

OTHER PUBLICATIONS

International Search Report; PCT/EP2013/065735; International File Date: Jul. 25, 2013; 2 pgs.
(Continued)

*Primary Examiner* — Gilbert Lee
(74) *Attorney, Agent, or Firm* — Schmeiser Olsen & Watts LLP

(57) ABSTRACT

A shaft seal arrangement with a shaft extending along an axis and with a stator, wherein a rotating sealing ring is arranged on the shaft and a static sealing ring is arranged on the stator, wherein the rotating sealing ring has a rotating sealing surface and the stationary sealing ring has a stationary sealing surface, wherein these sealing surfaces are arranged in such a way that they are located opposite one another in a sealing manner in a substantially radial sealing plane, wherein the shaft seal arrangement forms a contactless gas seal, wherein at least one of the sealing surfaces has a nonrotationally symmetrical surface contouring the rotating sealing ring is provided.

9 Claims, 6 Drawing Sheets

(51) Int. Cl.
  *F01D 11/02* (2006.01)
  *F16J 15/16* (2006.01)
  *F16J 15/40* (2006.01)

(56) References Cited

U.S. PATENT DOCUMENTS

| | | | |
|---|---|---|---|
| 3,970,320 A | 7/1976 | Wiese | |
| 4,407,513 A * | 10/1983 | Takenaka et al. | 277/400 |
| 4,884,945 A * | 12/1989 | Boutin et al. | 415/174.2 |
| 5,092,612 A * | 3/1992 | Victor et al. | 277/400 |
| 5,201,531 A | 4/1993 | Lai | |
| 5,217,233 A | 6/1993 | Pecht et al. | |
| 5,222,743 A | 6/1993 | Goldswain et al. | |
| 5,368,314 A * | 11/1994 | Victor et al. | 277/400 |
| 5,375,855 A | 12/1994 | Goldswain et al. | |
| 6,152,452 A | 11/2000 | Wang | |
| 6,341,782 B1 * | 1/2002 | Etsion | F16J 15/3424 |
| | | | 277/399 |
| 6,575,470 B1 * | 6/2003 | Gacek et al. | 277/399 |
| 8,381,695 B2 | 2/2013 | Klink et al. | |
| 2003/0021711 A1 | 1/2003 | Klink et al. | |
| 2003/0209859 A1 | 11/2003 | Young | |
| 2009/0200749 A1 * | 8/2009 | Teshima et al. | 277/512 |
| 2014/0117625 A1 * | 5/2014 | Short et al. | 277/408 |
| 2014/0341733 A1 * | 11/2014 | Lebigre | F16J 15/3412 |
| | | | 415/231 |

FOREIGN PATENT DOCUMENTS

| | | |
|---|---|---|
| CN | 201851656 U | 6/2011 |
| CN | 102359596 A | 2/2012 |
| DE | 1964150 A1 | 7/1970 |
| DE | 1775596 A1 | 3/1972 |
| DE | 2928504 A1 | 1/1981 |
| DE | 8814442 U1 | 3/1990 |
| DE | 3839106 A1 | 5/1990 |
| DE | 20216587 U1 | 1/2003 |
| EP | 0298324 A2 | 1/1989 |
| EP | 0298324 A3 | 10/1989 |
| FR | 1597609 A | 6/1970 |
| WO | 2014023581 A1 | 2/2014 |

OTHER PUBLICATIONS

Chinese Office Action Dated Dec. 25, 2015; Application No. 201380042519.X; 12 Pgs.
Chinese Office Action Issued Oct. 10, 2016, Application No. 201380042519.X; 11 pgs.

* cited by examiner

SHAFT SEAL ARRANGEMENT

CROSS-REFERENCE TO RELATED APPLICATION

This application claims priority to PCT Application No. PCT/EP2013/065735, having a filing date of Jul. 25, 2013, based off of DE 102012214276.2 having a filing date of Aug. 10, 2012, the entire contents of which are hereby incorporated by reference.

FIELD OF TECHNOLOGY

The following relates to a shaft seal arrangement with a shaft extending along an axis and a stator, wherein a rotating sealing ring is arranged on the shaft and a static sealing ring is arranged on the stator, wherein the rotating sealing ring has a rotating sealing surface and the static sealing ring has a stationary sealing surface, wherein these sealing surfaces are arranged in such a way that they are oppositely disposed with a sealing effect in an essentially radial plane, wherein the shaft seal arrangement forms a contactless gas seal, wherein at least one of the sealing surfaces has a non-rotationally symmetrical surface contouring.

BACKGROUND

Gas seals for fluid flow machines, especially compressors which are designed as turbomachines, are the preferred form of seal in the case of higher pressures as a result of the comparatively low leakage. For example, in comparison to conventional labyrinth seals the lower leakage of the dry gas seal enables by an order of magnitude a significant efficiency increase of the corresponding turbomachine.

Compared with the relatively simply constructed labyrinth seals, modern dry gas seals are comparatively demanding with regard to operating conditions. A reliable operation of dry gas seals is only possible if a slide film of dry gas between the two sealing rings is constantly supplied with gas in proportion to high process quality. The gas for the supplying of the gas film between the sealing rings has to be sufficiently dried on the one hand and on the other hand has also to be relatively free of foreign bodies. The auxiliary systems, for example of a process gas compressor, which are required for the gas treatment can definitely lie within the order of magnitude of the actual compressor with regard to their space requirement and the investment costs.

Shaft seal arrangements, which as a result of their principle of operation are dependent upon a high processing quality of the seal gas, are known from DE 690 19 296 T2, DE 692 04 703 T2, DE 693 03 749 T2, U.S. Pat. No. 5,222,743 A1 and U.S. Pat. No. 6,152,452 A1 respectively. From the search in relation to DE 10 2012 214 276.2, documents DE 19 64 150 A, DE 202 16587 U1, US 2003/0 209 859 A1, U.S. Pat. No. 6,341,782 B1, DE 17 75 596 A, DE 2618682 A1, DE 38 39 106 A1, DE 29 28 504 A1 and EP 1 275 864 A1, which also deal with shaft seals, are already known. Those, which focus on gas seals thereof, are dependent on a high processing quality of the seal gas and are regularly tied to direction of rotation.

SUMMARY

An aspect relates to a shaft seal arrangement of a gas seal which requires comparatively little preparation cost with regard to the seal gas.

A shaft seal arrangement means according to embodiments of the invention an arrangement which comprises a shaft seal which is also suitable for higher rotational speeds of the rotor. Counted among these are dry gas seals for high-speed turbocompressors, for example. Stuffing boxes, for example, are unsuitable for this application purpose. The dry gas seal, on account of the absence of contact of the two oppositely disposed sealing surfaces, gains the particular suitability for the high rotational speed. The absence of contact exists as a rule only if a gas slide film has formed between the two oppositely disposed sealing surfaces after a specific limiting speed. Whereas the claim version determines that one sealing ring is intended to be stationary and the other sealing ring is intended to rotate, it is only essential for the shaft seal arrangement according to embodiments of the invention that a relative rotation is carried out between the stationary and the rotating sealing rings. In this respect, no absolute movement state or static state is claimed. Of particular importance is the surface contouring of at least one of the two opposite sealing surfaces. This surface contouring is introduced according to embodiments of the invention into the seal surface by means of a specific manufacturing and is not, for example, the result of a waviness of the seal surface which lies within the manufacturing tolerance. The surface contouring according to embodiments of the invention is, moreover, non-rotationally symmetrical, wherein a rotationally symmetrical surface contouring as a result of the embodiments of invention is not excluded as an additional feature. In particular, an advantageous development of embodiments of the invention provides that at least one of the two opposite sealing surfaces, preferably both opposite sealing surfaces, has or have a specific rotationally symmetrical convex shape. The convex shape is preferably developed in this case in such a way that there is a specific gaping of the radial edge regions, with a central radial abutment of the two sealing surfaces, of approximately 1 µm to 10 µm. The gaping is preferably 1.5 to 3 µm.

The advantage of the surface contouring according to embodiments of the invention—unlike in the case of the prior art—is that no dirt, which could influence in particular the "lift-off" characteristic of the shaft seal arrangement, can accumulate in the surface contouring. The surface contourings according to embodiments of the invention are able to be kept clear of the dirt of the seal gas during operation because this cannot easily accumulate on the geometry according to embodiments of the invention. The customary comparatively sharp edges or discontinuities of the surface contouring or sealing surface in the prior art lead to small vortices or "dead water" flows which promote the accumulation of particles in the contouring or its contamination.

Accordingly, in the case of conventional surface contouring geometries, a specific cost has to be invested in the preparation of the seal gas, which cost can turn out to be significantly lower in the case of the geometry according to embodiments of the invention since the new shaft seal arrangement is more tolerant to contaminants as a result of its self-cleaning.

Since the continuous radial progression of the bottom surface of the depression according to embodiments of the invention in the sealing surface already brings along a significant improvement with regard to the self-cleaning of the sealing surface, the self-cleaning is additionally improved if the bottom surfaces also have a continuous tangential progression.

Within the meaning of embodiments of the invention, a continuous progression means that the corresponding progression line or progression contour in the specified direction is continuously differentiable. At the points of the required continuity, a discrete—that is to say finite—derivation value exists according to this. In other words, the progression in the corresponding region has no corners or edges with regard to the specified progression direction. A further advantageous development provides that the defined bottom surface of the surface contouring or depression is twice continuously differentiable in the radial direction. A further advantageous development provides that the bottom surface of the depression is twice continuously differentiable in the radial direction and in the tangential direction. A further advantageous development provides that the sealing surface is once continuously differentiable in the radial and/or tangential direction in the region of the boundary line. A further advantageous development provides that the sealing surface is twice continuously differentiable in the region of the boundary line and especially on the boundary line.

The previously specified features with regard to continuous differentiability are increasingly suitable in a graded manner in their order to minimize a contamination tendency.

All the direction indications, inclusive of the specifications for differentiability, relate to a coordinate system from the axis in the direction of the shaft axis, a radial direction perpendicular thereto and a direction tangential to these two directions. A further advantageous development provides that the depression continuously adjoins the other sealing surface at the boundary line. This arrangement additionally promotes minimization of the contamination tendency. If, instead of this, a lowering of the "lift-off" rotational speed is to be brought about, it may be expedient if the depression in the region of the boundary line discontinuously adjoins the other sealing surface.

For improved modularization of the shaft seal arrangement according to embodiments of the invention, it is expedient if the depressions are intrinsically symmetrical with regard to a radial plane so that the result is a sealing effect and "lift-off" rotational speed which are independent of rotational direction.

Another advantageous development provides that the boundary line forms a closed line in the respective sealing surface. Alternatively, the boundary line can begin and end at a boundary edge of the respective sealing surface, as a result of which the "lift-off" rotational speed is reduced.

In the event that the boundary line of the depression begins and ends at a boundary edge of the sealing surface, or has a first end there and has a second end there (the boundary line is not basically vectored)—that is to say forms an open geometry—it is expedient that the boundary line (in plain view of the sealing surface) has a parabolic shape. Also, from the point of view of production of the surface contouring, it is expedient if the depression has the geometry of a cone section (that is to say a circle or ellipse or parabola or triangle). With these contours, on the one hand good "lift-off" characteristics can be achieved and on the other hand good contamination tolerances can be realized. Since the boundary edge of the seal geometry is basically a circle with a comparatively large radius and no straight line, the depressions, only under the proviso that the outer contour or the boundary edge with its large radius is to be seen as a straight line, are the section of a cone or of a truncated cone.

According to embodiments of the invention, and particularly expediently, the bottom surface, defined by means of the boundary line, of the depression has a continuous progression, especially an increasing radial progression. To be understood by a continuous progression according to embodiments of the invention is that the progression is stepless. The continuous radial progression means that a function of the depth of the depression, in dependence upon the radius for a circumferential position in each case, meets the demands of the continuity on a real-value function. These demands are defined by the Epsilon-Delta criterion, for example. Preferably, and according to embodiments of the invention, this demand applies to all circumferential positions of the depression, inclusive of the boundary line, wherein the boundary line lies in the sealing plane.

In this case, it is advisable, and according to embodiments of the invention, that the depression adjoins the other sealing surface at an angle on the entire boundary line (LL) in such a way that the depression with a depth of 0 adjoins the other sealing surface along the entire boundary line.

An advantageous development of embodiments of the invention provides that the bottom surface of the depressions have uneven sections. As a result of this, an improvement of the sliding properties is made possible.

Alternatively or additionally, for the same motivation the bottom surface of the depressions can have even sections.

The sealing surface outside of the depressions preferably only has even sections. In other words, the sealing surface is completely even outside of the depressions, within the limits of the usual manufacturing tolerances at this point. In this way, the sliding properties are additionally improved.

A further advantageous development of embodiments of the invention provides that at the boundary line the bottom surface of the depression adjoins the other sealing surface with an obliquity, wherein this obliquity is defined as an angle ALPHA between the other sealing surface at a tangent to the bottom surface of the depression directly on the boundary line and perpendicularly to the boundary line ALPHA<=0.03°.

A further advantageous development of embodiments of the invention provides that $3*(10^{-6})$ m$<T<5*(10^{-6})$m applies to the depth T of the depression in relation to the other bottom surface.

A further advantageous development of embodiments of the invention provides that a maximum extent of the depression in the circumferential direction is between 10 and 40 mm.

A further advantageous development of embodiments of the invention provides that at least one boundary line, preferably all the boundary lines, does not, or do not, form a closed line in the sealing surface itself.

A further advantageous development of embodiments of the invention provides that in the case of a boundary line, which is not closed, adjoining the outside diameter of the sealing surface an extent of the depression in the circumferential direction is between 10 and 40 mm on the outside diameter of the sealing surface.

A further advantageous development of embodiments of the invention provides that in the case of a parabolic boundary line of the depression the bottom surface has parabolic height-level lines or lines of equal depth.

A further advantageous development of embodiments of the invention provides that the boundary lines have straight sections which extend at least partially at an angle to a radial line or to a radial.

The invention is explained in more detail in the following text with reference to drawings for exemplary clarification.

BRIEF DESCRIPTION

Some of the embodiments will be described in detail, with reference to the following figures, wherein like designations denote like members, wherein:

Figure 3:
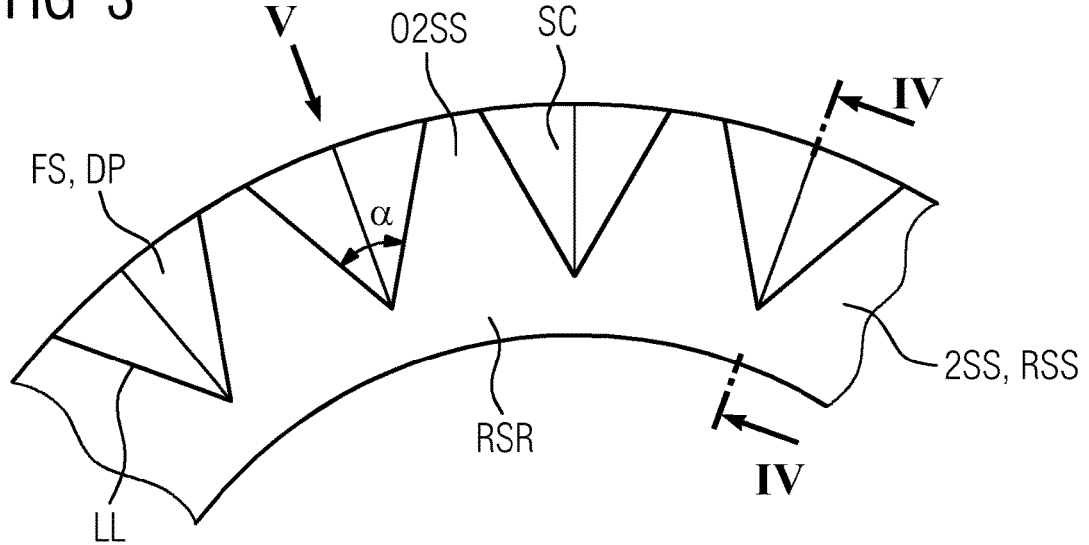
FIGS. 3, 7, 12, 13 show in each case a section in the circumferential direction of a plan view of a sealing ring with depressions according to embodiments of the invention.
Figure 4:
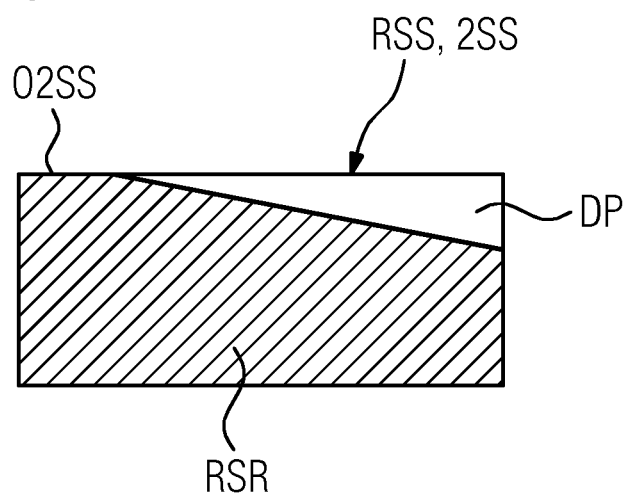
Figure 5:
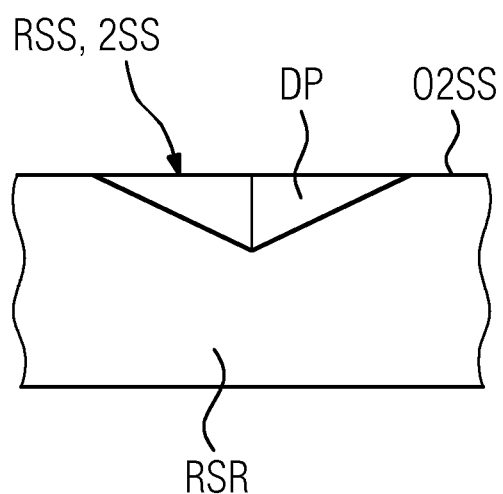
Figure 7:
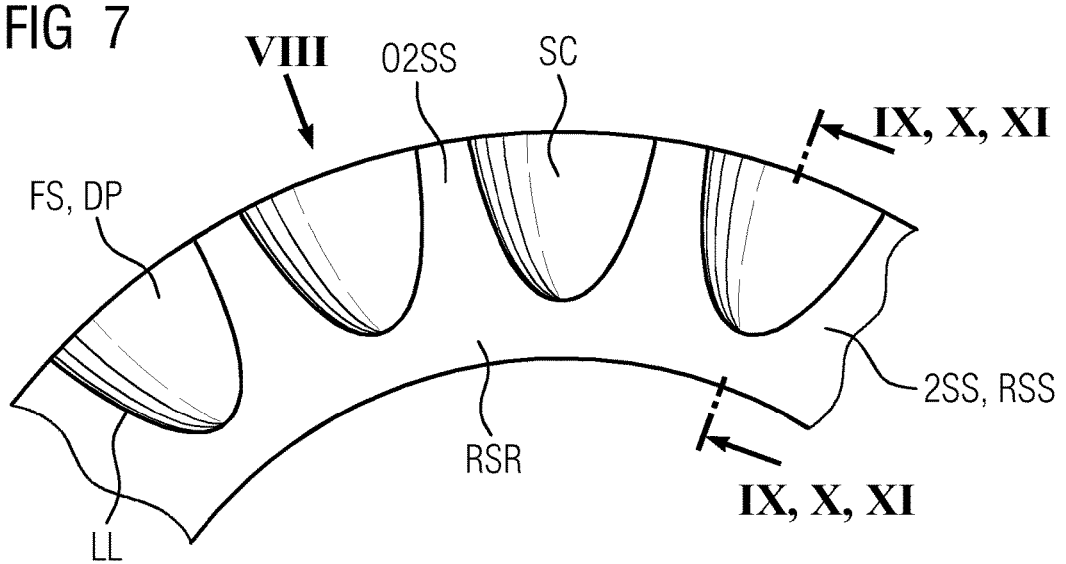
Figure 8:
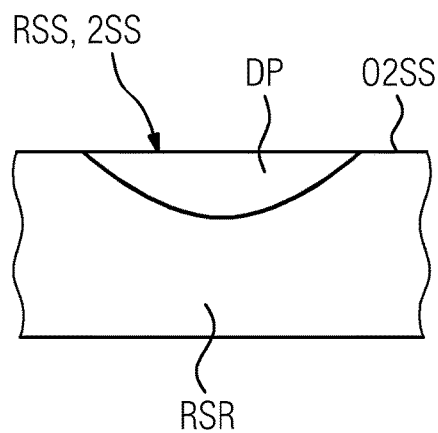
Figure 9:
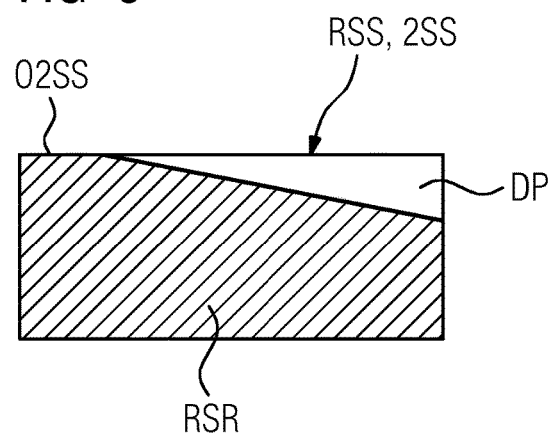
Figure 10:
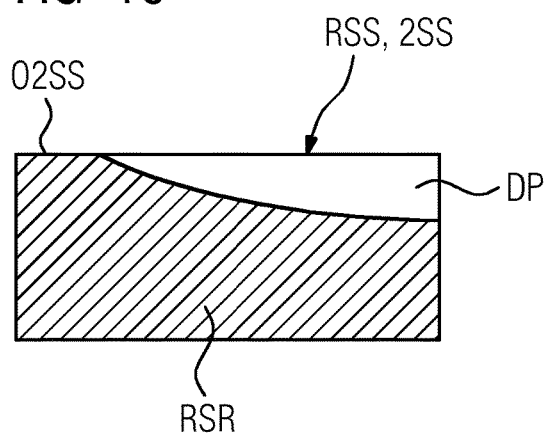

FIGS. 4, 9, 10, 11 show in each case a radial section through sealing rings according to FIGS. 3 and 7, wherein the sections identified by Roman numerals there correspond in their number count in each case to the figure numbering; and FIGS. 5, 8 show in each case a view, from radially on the outside, of the sealing ring circumferential segments of FIGS. 3 and 7, wherein the same relationship is provided with regard to the Roman numerals and the figure numbering.

DETAILED DESCRIPTION

Figure 1:
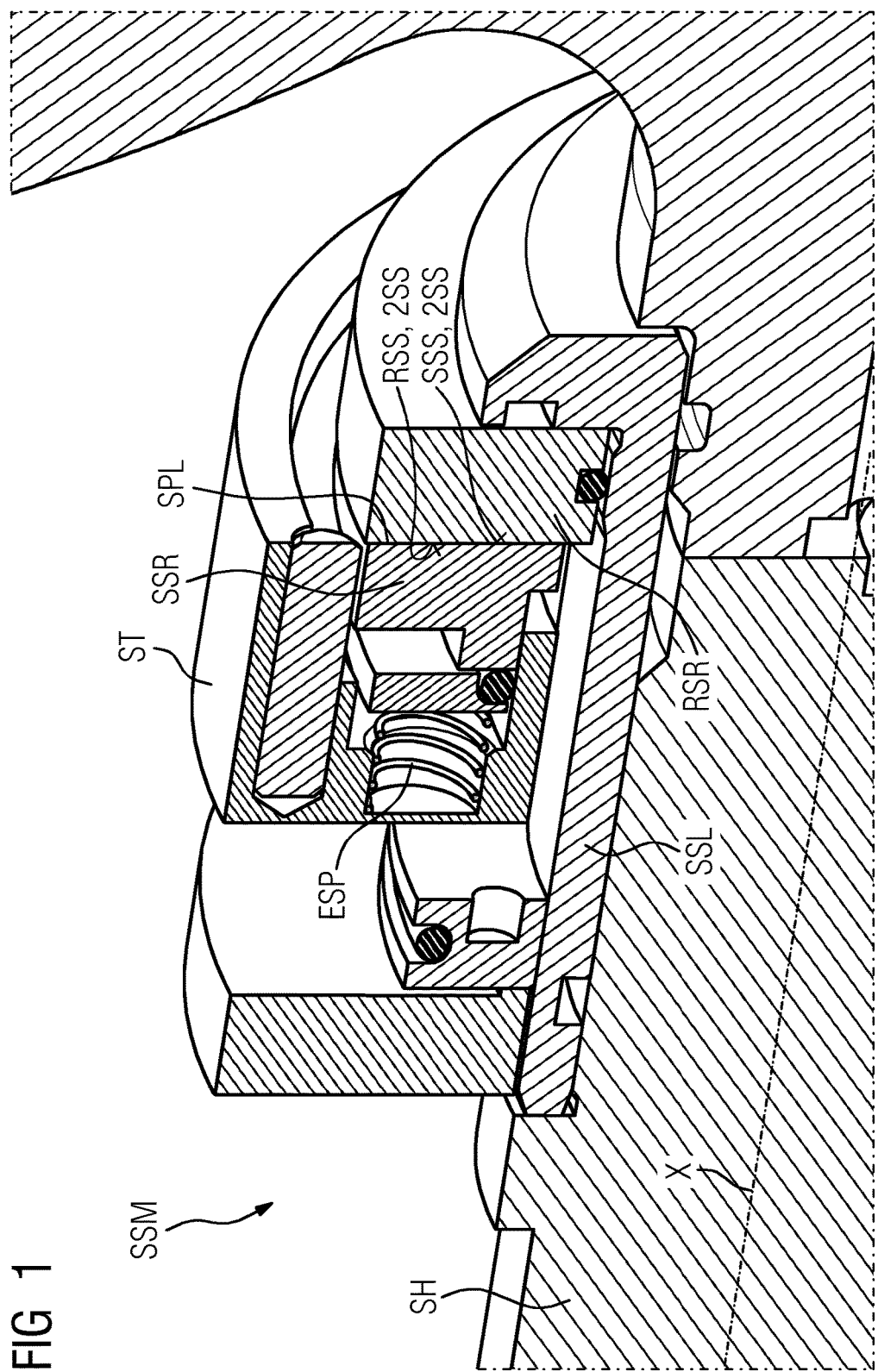
FIG. 1 shows a perspective view of a shaft seal arrangement according to embodiments of the invention.

FIG. 1 shows a shaft seal arrangement SSM according to embodiments of the invention with a shaft SH extending along an axis X.

If not specified otherwise, direction indications—such as axial, radial, tangential or circumferential direction—relate in this document to this axis X. A plane, for example a sealing plane of a shaft seal, is as a rule characterized in its extent by means of the surface normal or, synonymous therewith, at least two spatial directions are specified and are suitable for defining a plane. Thus, for example, an axial plane extends perpendicularly to the axis (e.g. shaft axis X) so that this plane extends radially and in the circumferential direction.

Figure 6:
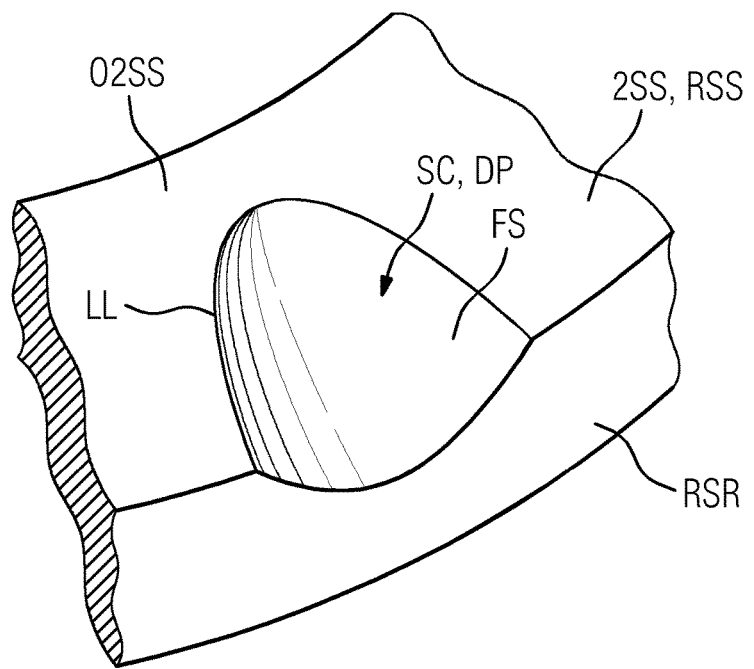

A stator ST, which is stationary in relation to the shaft SH, encompasses said shaft SH. The shaft seal arrangement SSM also comprises a shaft sleeve SSL which is fixedly attached on the shaft SH. A rotating sealing ring RSR also rotates in common with the shaft sleeve SSL and the shaft SH. Located opposite the rotating sealing ring RSR is a static sealing ring SSR which is connected in a rotation-resistant manner to the stator ST. The static sealing ring SSR has a stationary sealing surface SSS which is located in an essentially radial sealing plane SPL of a rotating sealing surface RSS of the rotating sealing ring RSR. An elastic spring ESP tensions the stationary sealing surface SSS against the rotating sealing surface RSS. In the following text, the rotating sealing surface RSS and the stationary sealing surface SSS, if it is not a question of their difference, are also simply referred to as sealing surface 2SS. At least one of the sealing surfaces 2SS is provided with a non-rotationally symmetrical contouring SC which is introduced by means of a specific manufacturing. The surface contouring SC has depressions DP, wherein the depressions DP have a boundary line LL in relation to the other sealing surface O2SS. The depression DP inside the boundary line LL is described by a bottom surface FS, as is also perspectively reproduced in FIGS. 2, 6.

FIGS. 2 to 5 essentially show a configuration of the depression DP according to embodiments of the invention. If the curvature of the radially outer boundary edge on the side of the sealing surface 2SS of the sealing ring is disregarded and this is considered to be a straight line on account of the large radius, then the depression DP of FIG. 2, especially in the projection of FIG. 3, describes a triangle.

It becomes clear especially in the projection of FIG. 3 that this triangle is split into two equal halves by the section IV so that a symmetry of the depression DP results with regard to a radial section. This, as well as in the remaining exemplary embodiments, implies an independence of the sealing ring 2SS, or of the achieved sealing effect, in relation to the rotational direction of the shaft seal arrangement SSM according to embodiments of the invention. The depression DP with a depth of 0 adjoins the other sealing surface O2SS on the boundary line LL, that is to say is continuous in extent. This continuity especially applies to the progression of the depression DP with regard to the radial section IV or according to the view of FIG. 4. The bottom surface FS of the depressions DP themselves is intrinsically continuous in the region of the radial section IV as well as with regard to all the other possible radial sections. This continuity promotes the minimization of the tendency towards the depositing of contaminants.

Figure 11:
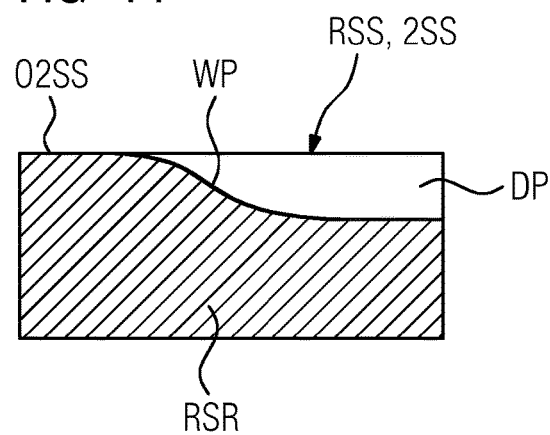

FIGS. 6 to 11 show an arrangement the geometry of the depression DP of which in the bottom surface FS is continuous not only with regard to all the radial progressions but also with regard to the tangential progressions. Furthermore, this geometry—in the sense of a preferred embodiment of the invention—is also continuously derivable in the radial and tangential directions according to FIG. 10 and FIG. 8. FIG. 11 shows a specific embodiment according to which the depression DP is also continuous in the region of the boundary line LL or of the transition to the bottom surface FS to the other sealing surface O2SS not only in the extent of the progression but is also continuously derivable.

To this end, the bottom surface FS in section comprises, preferably radially, at least one inflection point WP. Such a continuous and derived continuous geometry can be provided for minimizing the contamination tendency of the entire boundary line LL.

Figure 2:
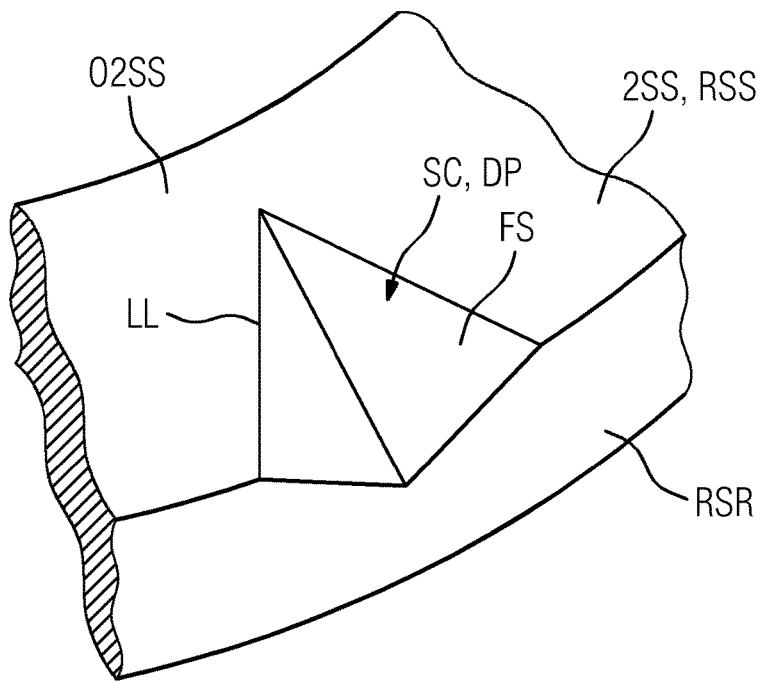
FIGS. 2, 6 show in each case a perspective and schematic view of a sealing surface according to embodiments of the invention with a depression.
Figure 12:
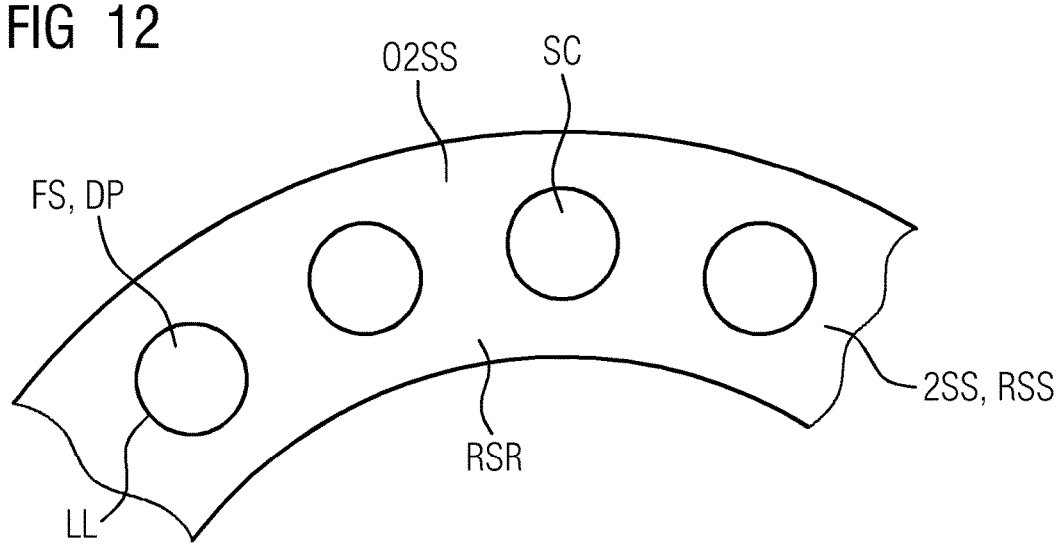
Figure 13:
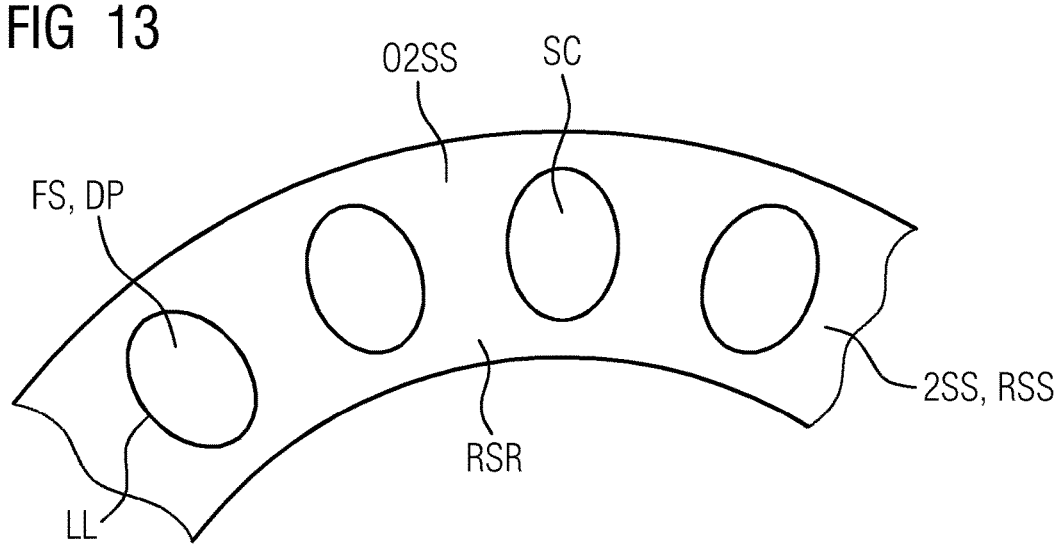

The boundary line LL, in the previously described simplified geometric perspective (large radius of the boundary edge of the sealing ring is approximately a straight line in relation to the other dimensions of the depression), can be of triangular design or as two half-lines which are designed to meet at an angle α at the radially innermost point of the depression DP. Another preferred development of embodiments of the invention provides that the boundary line LL has the geometry of a cone section or truncated cone section. The boundary line LL can be designed as a closed circle (FIG. 12) or as an ellipse (FIG. 13) or as a parabola (FIG. 6, FIG. 7) or as a triangle (FIGS. 3, 2).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A dry gas shaft seal arrangement comprising:
a shaft extending along an axis and a stator, wherein a rotating sealing ring
is arranged on the shaft and a static sealing ring is arranged on the stator, wherein the rotating sealing ring has a rotating axial sealing surface and the stationary sealing ring has a stationary axial sealing surface, wherein the rotating axial sealing surface and the stationary axial sealing surface are arranged in such a way that they are oppositely disposed with a sealing effect in an essentially axial sealing plane, wherein a shaft seal arrangement is formed as a contactless gas seal, wherein at least one of the rotating axial sealing surface and stationary axial sealing surface has a non-rotationally symmetrical surface structuring, wherein the non-rotationally symmetrical surface structuring comprises depressions in the sealing surface, wherein the depressions have in each case a boundary line to the other sealing surface and a bottom surface defined by the boundary line of the depression which has a continuous progression which is continuously differentiable throughout the depression, wherein the depression having a depth of 0, adjoins the other sealing surface on the boundary line.

2. The shaft seal arrangement as claimed in claim 1, wherein a continuous tangential progression characterizes the bottom surface.

3. The shaft seal arrangement as claimed in claim 1, wherein the depression continuously adjoins the other sealing surface on the boundary line.

4. The shaft seal arrangement as claimed in claim 1, wherein the boundary line forms a closed line in the sealing surface.

5. The shaft seal arrangement as claimed in claim 1, wherein the boundary line begins and ends at an outer radial boundary edge of the sealing surface.

6. The shaft seal arrangement as claimed in claim 5, wherein the boundary line consists of two straight lines which are arranged at an angle $\alpha$ to each other.

7. The shaft seal arrangement as claimed in claim 1, wherein the boundary line begins and ends at an inner radial boundary edge of the sealing surface.

8. The shaft seal arrangement as claimed in claim 1, wherein the boundary line has a parabolic shape.

9. The shaft seal arrangement as claimed in claim 1, wherein the depression is symmetrical with regard to an axial-radial plane.

* * * * *